(12) United States Patent
Rambo et al.

(10) Patent No.: US 8,447,916 B2
(45) Date of Patent: May 21, 2013

(54) INTERFACES THAT FACILITATE SOLID STATE STORAGE CONFIGURATION

(75) Inventors: Trenton P. Rambo, Seattle, WA (US); Sean Nicholas McGrane, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 636 days.

(21) Appl. No.: 12/706,715

(22) Filed: Feb. 17, 2010

(65) Prior Publication Data

US 2011/0202790 A1 Aug. 18, 2011

(51) Int. Cl.
*G06F 12/00* (2006.01)
*G06F 13/00* (2006.01)
*G06F 13/28* (2006.01)

(52) U.S. Cl.
USPC .............................. 711/103; 711/114; 711/115

(58) Field of Classification Search
None
See application file for complete search history.

(56) References Cited

U.S. PATENT DOCUMENTS

| | | | |
|---|---|---|---|
| 5,854,942 A | 12/1998 | Penokie | |
| 5,890,204 A | 3/1999 | Ofer et al. | |
| 6,295,575 B1 | 9/2001 | Blumenau et al. | |
| 6,519,679 B2 | 2/2003 | Devireddy et al. | |
| 7,210,077 B2 | 4/2007 | Brandenberger et al. | |
| 7,237,021 B2 | 6/2007 | Penny et al. | |
| 2006/0253549 A1* | 11/2006 | Arakawa et al. | 709/217 |
| 2007/0233916 A1 | 10/2007 | Seto | |
| 2008/0141043 A1 | 6/2008 | Flynn et al. | |
| 2008/0244331 A1 | 10/2008 | Grimes et al. | |
| 2009/0204872 A1 | 8/2009 | Yu et al. | |
| 2010/0262857 A1* | 10/2010 | Enarson et al. | 714/2 |
| 2010/0281299 A1* | 11/2010 | Garson et al. | 714/15 |
| 2012/0030442 A1* | 2/2012 | Nakanishi et al. | 711/163 |

OTHER PUBLICATIONS

"The High Performance SAN Alliance: SAN, SSD, and Virtualization", Retrieved at <<http://web.archive.org/web/20030831082223/http://cnscenter.future.co.kr/resource/rsc-center/vendor-wp/falconstor/HighPerformanceSANAllianceWhitePaper.pdf>> Aug. 31, 2003, pp. 5.
Hutsell, Woody "An In-depth Look at the RamSan-400 Solid State Disk", Retrieved at <<http://uk.sun.com/products/complementary/storage/ssd4/pdf/ssd4-indepth.pdf>> Sep. 2005, pp. 1-15.
Bitar, Roger, "Deploying Hybrid Storage Pools with Sun Flash Technology and the Solaris ZFS™ File System", Retrieved at <<http://www.absol.co.za/medialib/Downloads/Home/AboutUs/News/DEPLOYING%20HYBRID% 20STORAGE%20POOLS.pdf>> Oct. 31, 2008, pp. 15.
"Avere Systems FXT Series Delivers High Performance and Greater Efficiencies to Storage Networks", Retrieved at http://www.greensupplyline.com/shared3/prnews/showPRNews.jhtml?art_id=E784601>> Oct. 5, 2009, pp. 2.
"International Search Report", Mailed Date: Sep. 30, 2011, Application No. PCT/US2011/023816, Filed Date: Feb. 4, 2011, pp. 8.

* cited by examiner

*Primary Examiner* — Yaima Campos

(57) ABSTRACT

Aspects of the subject matter described herein relate to storage configuration. In aspects, an interface is used to discover the existence, capacity, and characteristics of solid state storage. This information may be provided to a user or storage management process which may use the information to configure the solid state storage. When appropriate, bus bandwidth to the solid state storage as well as bandwidth to memory components of the solid state storage may be configured. Configuration and re-configuration may be performed automatically according to one or more policies maintained locally or remotely.

20 Claims, 12 Drawing Sheets

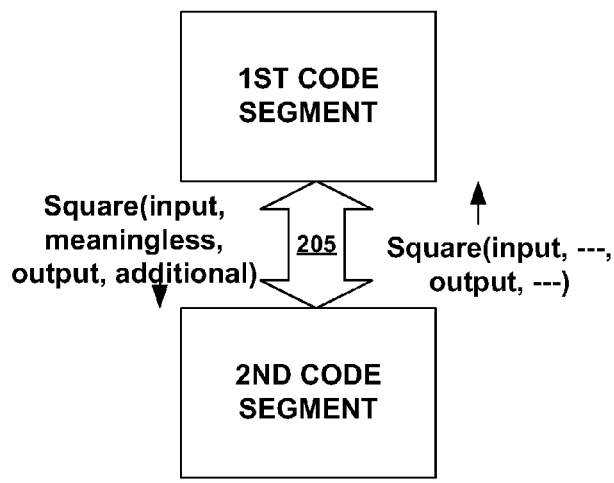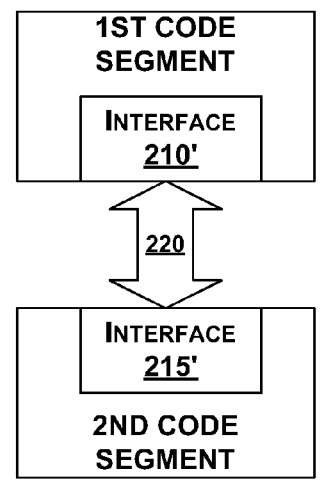
*FIG. 4A*  *FIG. 4B*
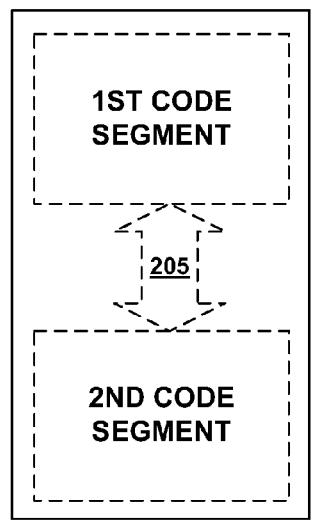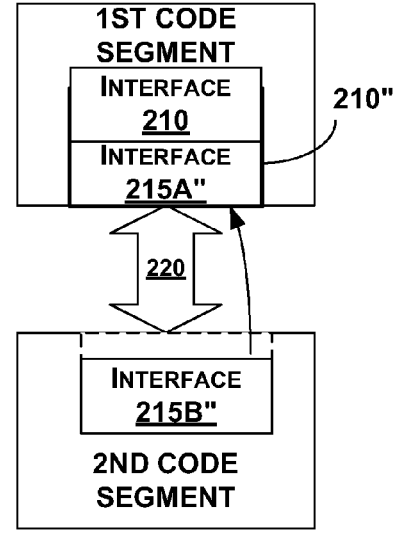
*FIG. 5A*  *FIG. 5B*

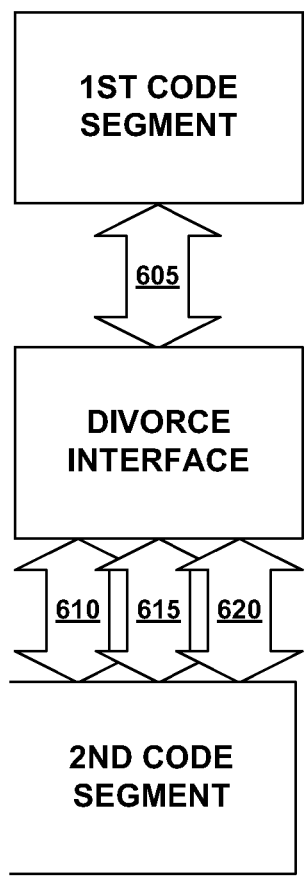 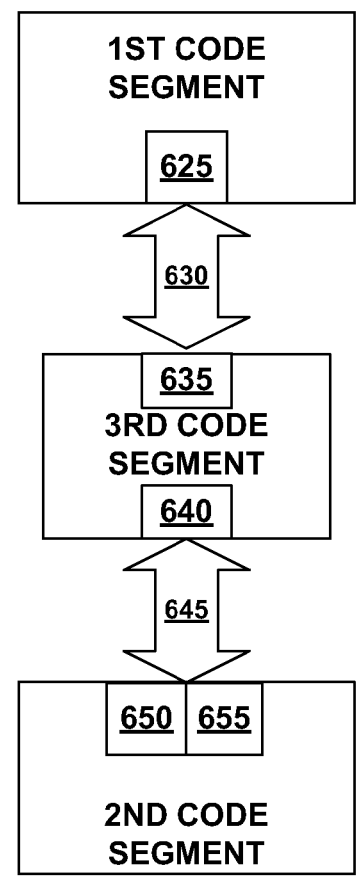
FIG. 6A
FIG. 6B

INTERFACES THAT FACILITATE SOLID STATE STORAGE CONFIGURATION

BACKGROUND

Rotational media such as hard drives have been standard in computing environments for many years. Solid-state storage, however, is starting to become a viable option in some environments. As reliability increases and costs decrease, solid-state storage is poised to take on a larger role in non-volatile storage.

Current solid state storage devices typically focus on using the same form factors and interfaces as the hard drives they replace. For example, a solid state storage device may include a serial attached SCSI (SAS) interface or a serial advanced technology attachment (SATA) interface to provide a well-known interface to the solid state storage device. Furthermore, the solid state storage device may be housed in a hard-drive like enclosure that has connections such that the solid state storage device can easily be inserted in a hard drive slot of a computer system. While compatible, packaging solid state storage devices in this manner may limit performance and flexibility and increase costs.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to storage configuration. In aspects, an interface is used to discover the existence, capacity, and characteristics of solid state storage. This information may be provided to a user or storage management process which may use the information to configure the solid state storage. When appropriate, bus bandwidth to the solid state storage as well as bandwidth to memory components of the solid state storage may be configured. Configuration and re-configuration may be performed automatically according to one or more policies maintained locally or remotely.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" is to be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

BRIEF DESCRIPTION OF THE DRAWINGS

FIGS. 2A-6B are block diagrams generally representing exemplary application programming interfaces that may operate in accordance with aspects of the subject matter described herein;

DETAILED DESCRIPTION

Definitions

As used herein, the term "includes" and its variants are to be read as open-ended terms that mean "includes, but is not limited to." The term "or" is to be read as "and/or" unless the context clearly dictates otherwise. The term "based on" is to be read as "based at least in part on." The terms "one embodiment" and "an embodiment" are to be read as "at least one embodiment." The term "another embodiment" is to be read as "at least one other embodiment." Other definitions, explicit and implicit, may be included below.

Exemplary Operating Environment

Figure 1:
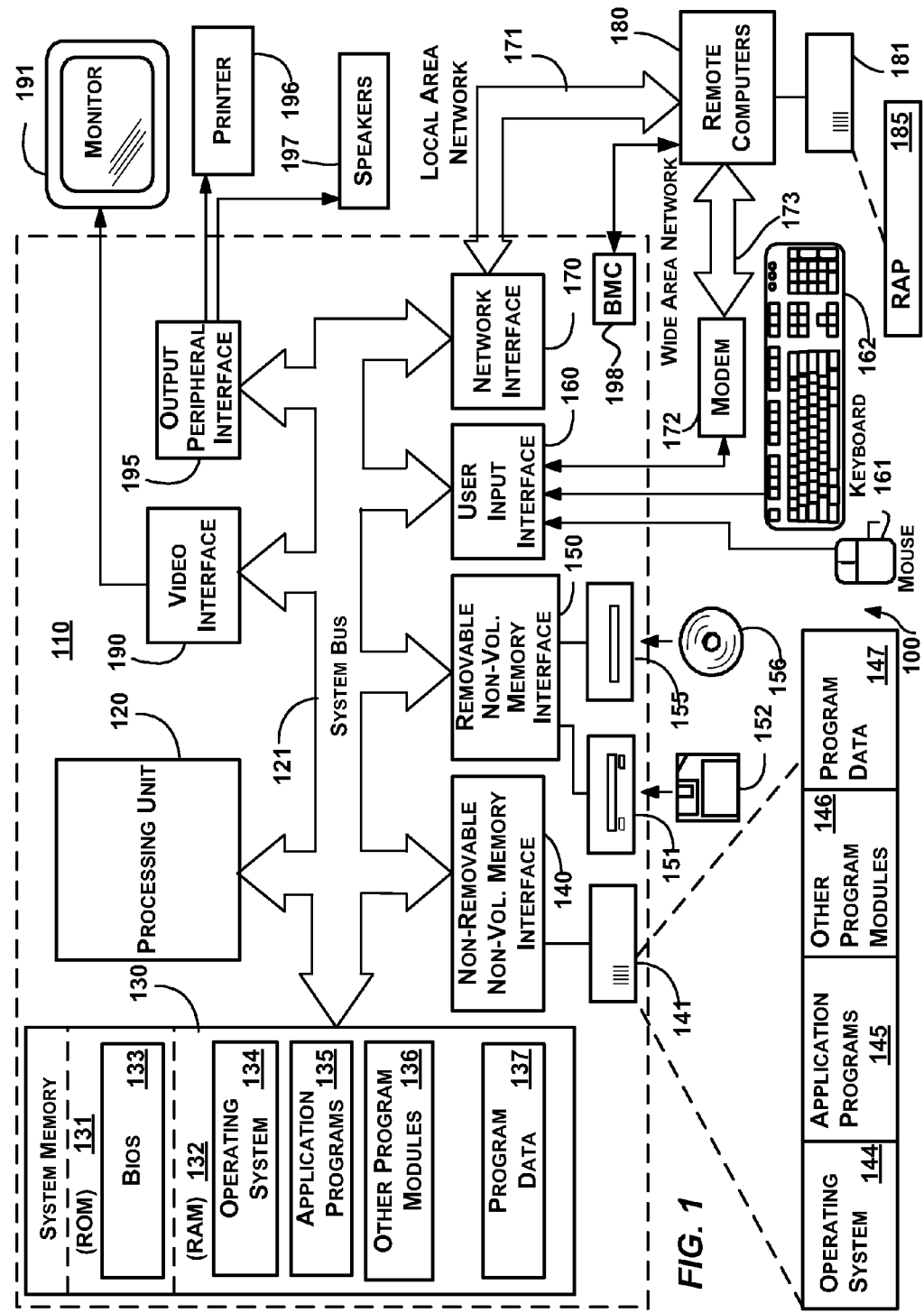
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, or configurations that may be suitable for use with aspects of the subject matter described herein comprise personal computers, server computers, hand-held or laptop devices, multiprocessor systems, microcontroller-based systems, set-top boxes, programmable consumer electronics, network PCs, minicomputers, mainframe computers, personal digital assistants (PDAs), gaming devices, printers, appliances including set-top, media center, or other appliances, automobile-embedded or attached computing devices, other mobile devices, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. A computer may include any electronic device that is capable of executing an instruction. Components of the computer 110 may include a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media.

Computer storage media includes both volatile and nonvolatile, removable and non-removable media implemented in any method or technology for storage of information such as computer-readable instructions, data structures, program modules, or other data. Computer storage media includes RAM, ROM, EEPROM, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include magnetic tape cassettes, flash memory cards, digital versatile discs, other optical discs, digital video tape, solid state RAM, solid state ROM, and the like. The hard disk drive 141 is typically connected to the system bus 121 through a non-removable memory interface such as interface 140, and magnetic disk drive 151 and optical disc drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies.

A user may enter commands and information into the computer 110 through input devices such as a keyboard 162 and pointing device 161, commonly referred to as a mouse, trackball, or touch pad. Other input devices (not shown) may include a microphone, joystick, game pad, satellite dish, scanner, a touch-sensitive screen, a writing tablet, or the like. These and other input devices are often connected to the processing unit 120 through a user input interface 160 that is coupled to the system bus, but may be connected by other interface and bus structures, such as a parallel port, game port or a universal serial bus (USB).

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

A baseboard management controller (e.g., BMC 198) may be embedded on the computer 110 to allow the computer 110 to communicate with other devices out-of-band (e.g., without using an operating system). The BMC 198 may be able to report temperature, cooling fan speeds, power mode, operating system status, and the like to a console. The BMC 198 may include a processor that is capable of operating at a very low power draw when other components of the computer 110 are turned off. In addition, the BMC 198 may communicate what power capabilities the computer 110 has and may be able to set the power level of the computer 110. Power capabilities include the different power level(s) at which the computer 110 is able to operate.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, handheld or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a mobile device. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Although the term "server" is sometimes used herein, it is to be understood that a server may be implemented as a machine that has hardware and/or software that is typically associated with a personal computer or some other device. Indeed, the use of the term "server" is not intended to limit aspects of the subject matter described herein to machines that have upgraded or enhanced capabilities.

Interfaces

A programming interface (or more simply, interface) may be viewed as any mechanism, process, or protocol for enabling one or more segment(s) of code to communicate with or access the functionality provided by one or more other segment(s) of code. Alternatively, a programming interface may be viewed as one or more mechanism(s), method(s), function call(s), module(s), object(s), and the like of a component of a system capable of communicative coupling to one or more mechanism(s), method(s), function call(s), module(s), and the like of other component(s). The term "segment of code" is intended to include one or more instructions or lines of code, and includes, for example, code modules, objects, subroutines, functions, and so on, regardless of the terminology applied or whether the code segments are separately compiled, or whether the code segments are provided as source, intermediate, or object code, whether the code segments are utilized in a runtime system or process, or whether they are located on the same or different machines or distributed across multiple machines, or whether the functionality represented by the segments of code are implemented wholly in software, wholly in hardware, or a combination of hardware and software.

Figure 2A:
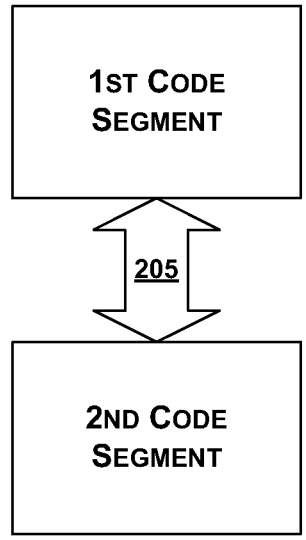
Figure 2B:
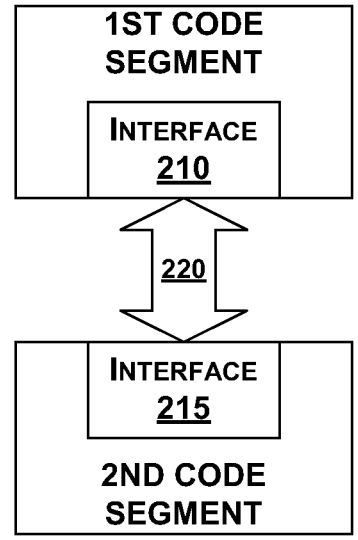

Notionally, a programming interface may be viewed generically, as shown in FIG. 2A or FIG. 2B. FIG. 2A illustrates an interface 205 as a conduit through which first and second code segments communicate. FIG. 2B illustrates an interface as comprising interface objects 210 and 215 (which may or may not be part of the first and second code segments), which enable first and second code segments of a system to communicate via medium 220. In the view of FIG. 2B, one may consider interface objects 210 and 215 as separate interfaces of the same system and one may also consider that objects 210 and 215 plus medium 220 comprise the interface. Although FIGS. 2A and 2B show bi-directional flow and interfaces on each side of the flow, certain implementations may only have information flow in one direction (or no information flow as described below) or may only have an interface object on one side. By way of example, and not limitation, terms such as application programming interface (API), entry point, method, function, subroutine, remote procedure call, and component object model (COM) interface, are encompassed within the definition of programming interface.

Aspects of such a programming interface may include the method whereby the first code segment transmits information (where "information" is used in its broadest sense and includes data, commands, requests, etc.) to the second code segment; the method whereby the second code segment receives the information; and the structure, sequence, syntax, organization, schema, timing, and content of the information. In this regard, the underlying transport medium itself may be unimportant to the operation of the interface, whether the medium be wired or wireless, or a combination of both, as long as the information is transported in the manner defined by the interface. In certain situations, information may not be passed in one or both directions in the conventional sense, as the information transfer may be either via another mechanism (e.g., information placed in a buffer, file, etc. separate from information flow between the code segments) or non-existent, as when one code segment simply accesses functionality performed by a second code segment. Any or all of these aspects may be used in a given situation, for example, depending on whether the code segments are part of a system in a loosely coupled or tightly coupled configuration, and so this list is to be considered illustrative and non-limiting.

This notion of a programming interface is known to those skilled in the art and is clear from the foregoing detailed description. There are, however, other ways to implement a programming interface, and, unless expressly excluded, these too are intended to be encompassed by the claims set forth at the end of this specification. Such other ways may appear to be more sophisticated or complex than the simplistic view of FIGS. 2A and 2B, but they nonetheless perform a similar function to accomplish the same overall result. Below are some illustrative alternative implementations of a programming interface.

A. Factoring

Figure 3A:
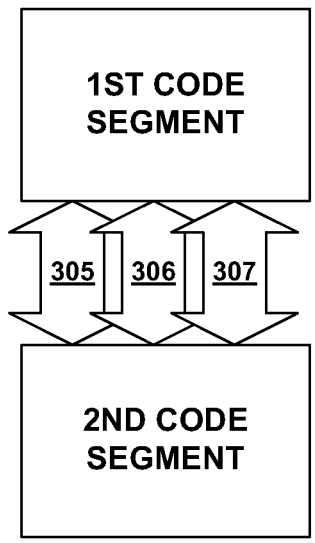

A communication from one code segment to another may be accomplished indirectly by breaking the communication into multiple discrete communications. This is depicted schematically in FIGS. 3A and 3B. As shown, some interfaces can be described in terms of divisible sets of functionality. Thus, the interface functionality of FIGS. 2A and 2B may be factored to achieve the same result, just as one may mathematically provide 24 as 2 times 2 times 3 times 2. Accordingly, as illustrated in FIG. 3A, the function provided by interface 205 may be subdivided to convert the communications of the interface into multiple interfaces 305, 306, 307, and so on while achieving the same result.

Figure 3B:
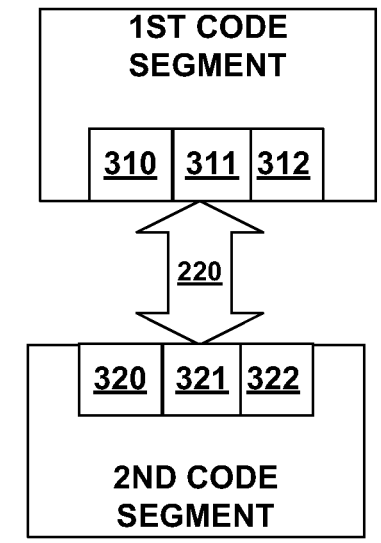

As illustrated in FIG. 3B, the function provided by interface 210 may be subdivided into multiple interfaces 310, 311, 312, and so forth while achieving the same result. Similarly, interface 215 of the second code segment which receives information from the first code segment may be factored into multiple interfaces 320, 321, 322, and so forth. When factoring, the number of interfaces included with the $1^{st}$ code segment need not match the number of interfaces included with the $2^{nd}$ code segment. In either of the cases of FIGS. 3A and 3B, the functional spirit of interfaces 205 and 210 remain the same as with FIGS. 2A and 2B, respectively.

The factoring of interfaces may also follow associative, commutative, and other mathematical properties such that the factoring may be difficult to recognize. For instance, ordering of operations may be unimportant, and consequently, a function carried out by an interface may be carried out well in advance of reaching the interface, by another piece of code or interface, or performed by a separate component of the system. Moreover, one of ordinary skill in the programming arts can appreciate that there are a variety of ways of making different function calls that achieve the same result.

B. Redefinition

In some cases, it may be possible to ignore, add, or redefine certain aspects (e.g., parameters) of a programming interface while still accomplishing the intended result. This is illustrated in FIGS. 4A and 4B. For example, assume interface 205 of FIG. 2A includes a function call Square (input, precision, output), that includes three parameters, input, precision and output, and which is issued from the $1^{st}$ Code Segment to the $2^{nd}$ Code Segment. If the middle parameter precision is of no concern in a given scenario, as shown in FIG. 4A, it could just as well be ignored or even replaced with a meaningless (in this situation) parameter. An additional parameter of no concern may also be added. In either event, the functionality of square can be achieved, so long as output is returned after input is squared by the second code segment.

Precision may very well be a meaningful parameter to some downstream or other portion of the computing system; however, once it is recognized that precision is not necessary for the narrow purpose of calculating the square, it may be replaced or ignored. For example, instead of passing a valid precision value, a meaningless value such as a birth date could be passed without adversely affecting the result. Similarly, as shown in FIG. 4B, interface 210 is replaced by interface 210', redefined to ignore or add parameters to the interface. Interface 215 may similarly be redefined as interface 215', redefined to ignore unnecessary parameters, or parameters that may be processed elsewhere. As can be seen, in some cases a programming interface may include aspects, such as parameters, that are not needed for some purpose, and so they may be ignored or redefined, or processed elsewhere for other purposes.

C. Inline Coding

It may also be feasible to merge some or all of the functionality of two separate code modules such that the "interface" between them changes form. For example, the functionality of FIGS. 2A and 2B may be converted to the functionality of FIGS. 5A and 5B, respectively. In FIG. 5A, the previous $1^{st}$ and $2^{nd}$ Code Segments of FIG. 2A are merged into a module containing both of them. In this case, the code segments may still be communicating with each other but the interface may be adapted to a form which is more suitable to the single module. Thus, for example, formal Call and Return statements may no longer be necessary, but similar processing or response(s) pursuant to interface 205 may still be in effect. Similarly, shown in FIG. 5B, part (or all) of interface 215 from FIG. 2B may be written inline into interface 210 to form interface 210". As illustrated, interface 215 is divided into 215A" and 215B", and interface portion 215A" has been coded in-line with interface 210 to form interface 210".

For a concrete example, consider that the interface 210 from FIG. 2B may perform a function call square (input, output), which is received by interface 215, which after processing the value passed with input (to square it) by the second code segment, passes back the squared result with output. In such a case, the processing performed by the second code segment (squaring input) can be performed by the first code segment without a call to the interface.

D. Divorce

A communication from one code segment to another may be accomplished indirectly by breaking the communication into multiple discrete communications. This is depicted schematically in FIGS. 6A and 6B. As shown in FIG. 6A, one or more piece(s) of middleware (Divorce Interface(s), since they divorce functionality and/or interface functions from the original interface) are provided to convert the communications on the first interface 605, to conform them to a different interface, in this case interfaces 610, 615, and 620. This might be done, for example, where there is an installed base of applications designed to communicate with, say, an operating system in accordance with the first interface 605's protocol, but then the operating system is changed to use a different interface, in this case interfaces 610, 615, and 620. It can be seen that the original interface used by the $2^{nd}$ Code Segment is changed such that it is no longer compatible with the interface used by the $1^{st}$ Code Segment, and so an intermediary is used to make the old and new interfaces compatible.

Similarly, as shown in FIG. 6B, a third code segment can be introduced with divorce interface 635 to receive the communications from interface 630 and with divorce interface 640 to transmit (e.g., via interface 645) the interface functionality to, for example, interfaces 650 and 655, redesigned to work with the interface 640, but to provide the same functional result. Similarly, the interfaces 635 and 640 may work together to translate the functionality of interfaces 210 and 215 of FIG. 2B to a new operating system, while providing the same or similar functional result.

E. Rewriting

Yet another possible variant is to dynamically rewrite the code to replace the interface functionality with something else but which achieves the same overall result. For example, there may be a system in which a code segment presented in an intermediate language (e.g. Microsoft IL, Java® Byte-Code, etc.) is provided to a Just-in-Time (JIT) compiler or interpreter in an execution environment (such as that provided by the .Net framework, the Java® runtime environment, or other similar runtime type environments). The JIT compiler may be written so as to dynamically convert the communications from the $1^{st}$ Code Segment to the $2^{nd}$ Code Segment, i.e., to conform them to a different interface as may be required by the $2^{nd}$ Code Segment (either the original or a different $2^{nd}$ Code Segment). This is depicted in FIGS. 7 and 8.

Figure 7:
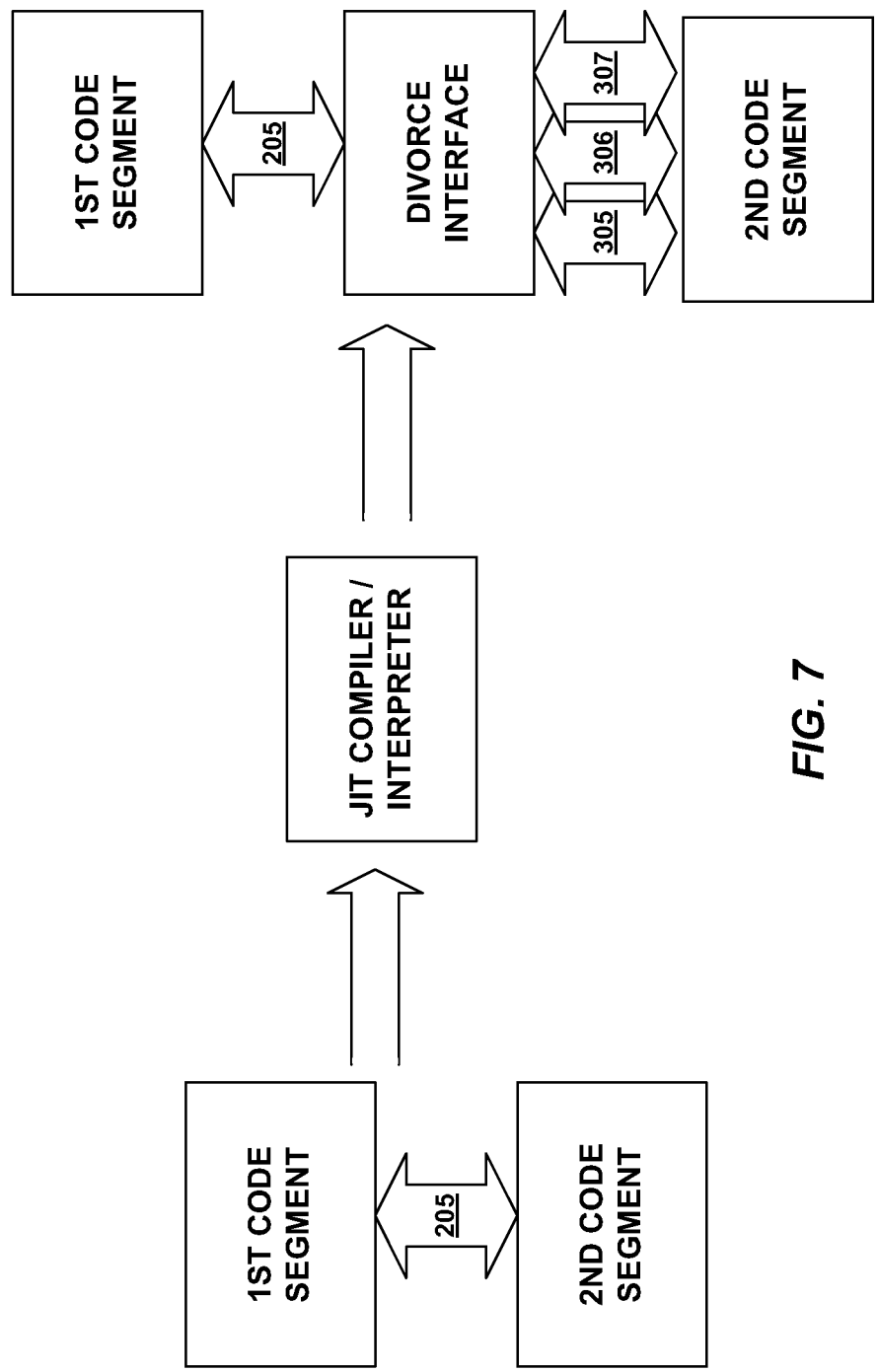
FIGS. 7 and 8 are block diagrams that generally represent how a compiler or interpreter may transform one or more interfaces to one or more other interfaces in accordance with aspects of the subject matter described herein.
Figure 8:
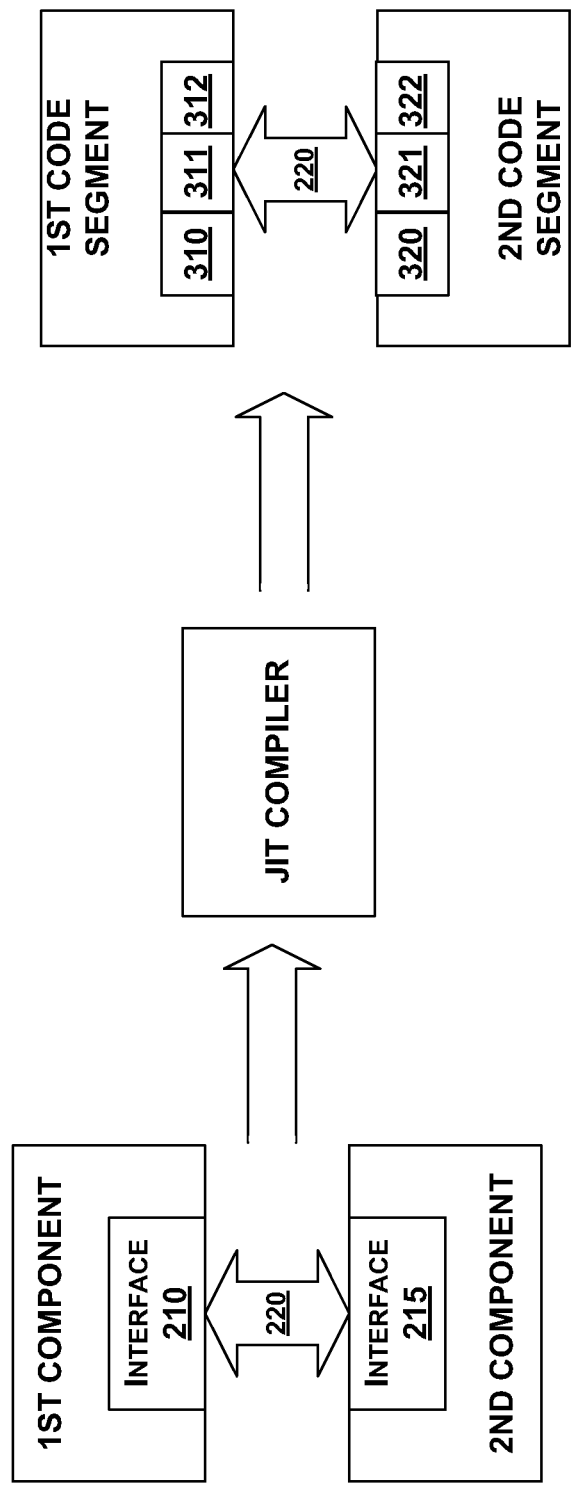

As can be seen in FIG. 7, this approach is similar to the Divorce scenario described above. It might be done, for example, where an installed base of applications are designed to communicate with an operating system in accordance with a first interface protocol, but then the operating system is changed to use a different interface. The JIT Compiler may be used to conform the communications on the fly from the installed-base applications to the new interface of the operating system. As depicted in FIG. 8, this approach of dynamically rewriting the interface(s) may be applied to dynamically factor, or otherwise alter the interface(s) as well.

It is also noted that the above-described scenarios for achieving the same or similar result as an interface via alternative embodiments may also be combined in various ways, serially and/or in parallel, or with other intervening code. Thus, the alternative embodiments presented above are not mutually exclusive and may be mixed, matched, and combined to produce the same or equivalent scenarios to the generic scenarios presented in FIGS. 2A and 2B. It is also noted that, as with most programming constructs, there are other similar ways of achieving the same or similar functionality of an interface which may not be described herein, but nonetheless are represented by the spirit and scope of the subject matter described herein, i.e., it is noted that it is at least partly the functionality represented by, and the advantageous results enabled by, an interface that underlie the value of an interface.

Storage Configuration

As mentioned previously, packaging solid state storage devices in a well-known form factor for rotational type interfaces, while compatible, may limit performance and flexibility and increase costs.

Figure 9:
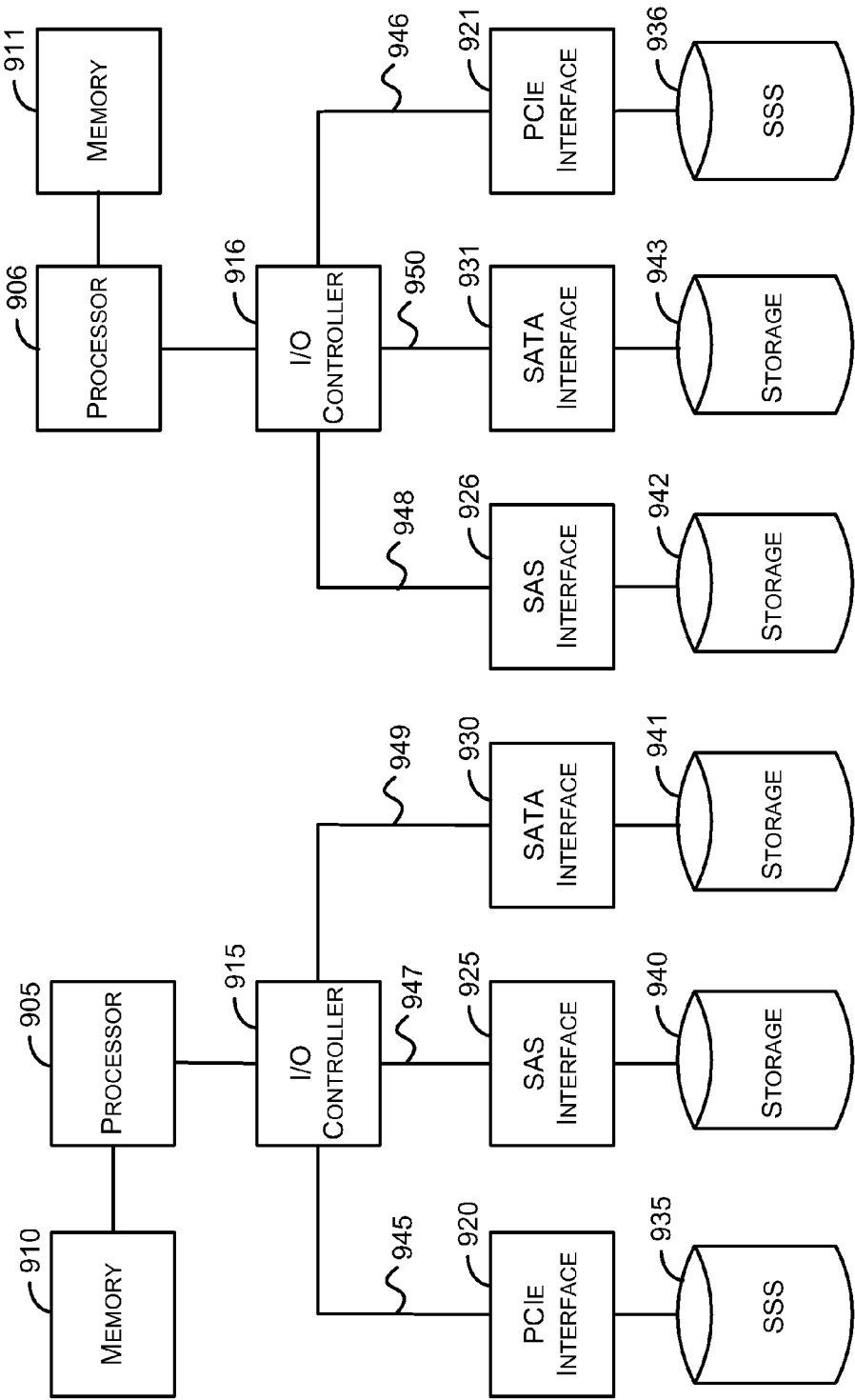
FIG. 9 is a block diagram that represents an exemplary environment in which aspects of the subject matter described herein may be implemented.

FIG. 9 is a block diagram that represents an exemplary environment in which aspects of the subject matter described herein may be implemented. The environment includes processors 905-906, memories 910-911, I/O controllers 915-916, PCI Express (PCIe) buses 945-950, PCIe interfaces 920-921, SAS interfaces 925-926, SATA interfaces 930-931, solid state storage 935-936, and storage 940-943. The term "storage" is sometimes used to indicate the solid state storage 935-326 and/or the storage 940-943.

The processors 905-906 correspond to the processing unit 120 of FIG. 1, and the memories 910-911 corresponds to the RAM 132 of FIG. 1 and may be implemented using identical or similar technology as the corresponding components described in FIG. 1.

Although the environment as illustrated includes various components, it will be recognized that more, fewer, or a different combination of these components and others may be employed without departing from the spirit or scope of aspects of the subject matter described herein. Furthermore, the components may be configured in a variety of ways as will be understood by those skilled in the art without departing from the spirit or scope of aspects of the subject matter described herein.

The SAS interfaces 925-926 present a SCSI interface to access the storage 940 and 942, respectively. The SATA interfaces 930-931 present a SATA interface for interfacing with the storage 941 and 943, respectively. Although not shown, parallel ATA (PATA) interfaces may exist that provide PATA interfaces to access storage. The PCIe interfaces 920-921 allow access to the solid state storage 935-936, respectively. The PCIe interfaces 920-921 may be pass through or other host-to-device interfaces that are included with the solid state storage (see, e.g., device interface 1005 of FIG. 10).

The storage 940-943 may include device interfaces that reside on devices housing the storage 940-943. The device interfaces may translate commands received from I/O controllers into actions used to access data on the storage 940-943. Access as used herein may include reading data, writing data, deleting data, updating data, a combination including two or more of the above, and the like.

The storage 940-943 may include rotational storage devices such as hard disk drives, CD drives, DVD drives, tape drives, other devices that present an SAS or SATA interface, and the like.

The PCIe buses 945-950 may include any bus that operates in accordance with the PCIe standards or the successors to these standards. A PCIe bus may connect to solid state storage (sometimes referred to as SSS). In some embodiments, a PCIe bus may connect to a controller that is able to communicate with multiple SSS entities.

The solid state storage (sometimes referred to as SSS) 935-936 may include device interfaces (not shown). These interfaces may be used to discover and configure the SSS 935-936. These interfaces may be accessed via the PCIe buses 945-946. The term SSS is used herein to refer to one or more solid state storage entities. A solid state storage entity may include a device interface and collection of memory components such as described in conjunction with FIGS. 9, 10, 11, and 14.

Note that data travelling to and from the storage 940-943 may go through several interfaces before the data is available for the processors to use. Each interface may add latency as well as impose various restrictions on what commands may be given to the stores.

Note that data traveling to the SSS 935-936 may go directly from the I/O controllers 915-916 to the SSS 935-936 via the PCIe buses 945-946 without any intervening SAS or SATA interface. In one embodiment, the I/O controllers 915 and 916 may be embedded in the processors 905 and 906, respectively.

When configuring an apparatus, storage may be partitioned and formatted with file systems. In addition, one or more of storage components may be configured in a RAID configuration to boost performance or reliability. An operating system or other programs may also be installed on the storage. When the apparatus is booted up, interfaces associated with the storage may be used to discover the storage and report information about the storage to their respective I/O controllers.

The storage may be hot swappable to allow for insertion into and removal from the apparatus while the apparatus is turned on. Storage may be connected to a back plane of a computer. The back plane may be connected to a controller. The storage may be enclosed in an enclosure that facilitates inserting and removing the storage from the apparatus.

SSS may be created using NAND, NOR, flash memory, or other memory components. The non-volatile memory of SSS may be provided as a collection of memory components (e.g., chips) where each memory device includes a specified amount of memory. SSS may consume less power and perform better than a rotational hard drive of similar capacity—although this is not a requirement of aspects of the subject matter described herein.

In one configuration, an SSS may be configured with a dual interface to be interface-compatible with common rotating storage devices. In other words, the SSS may include a device interface such as an SAS or SATA interface as well as another interface (e.g., a PCIe or other interface). The SAS or SATA interface may allow compatibility with software that is unaware of how to utilize the other interface while the other interface may be used to discover and configure additional characteristics of the SSS as well as access data of the SSS.

Figure 10:
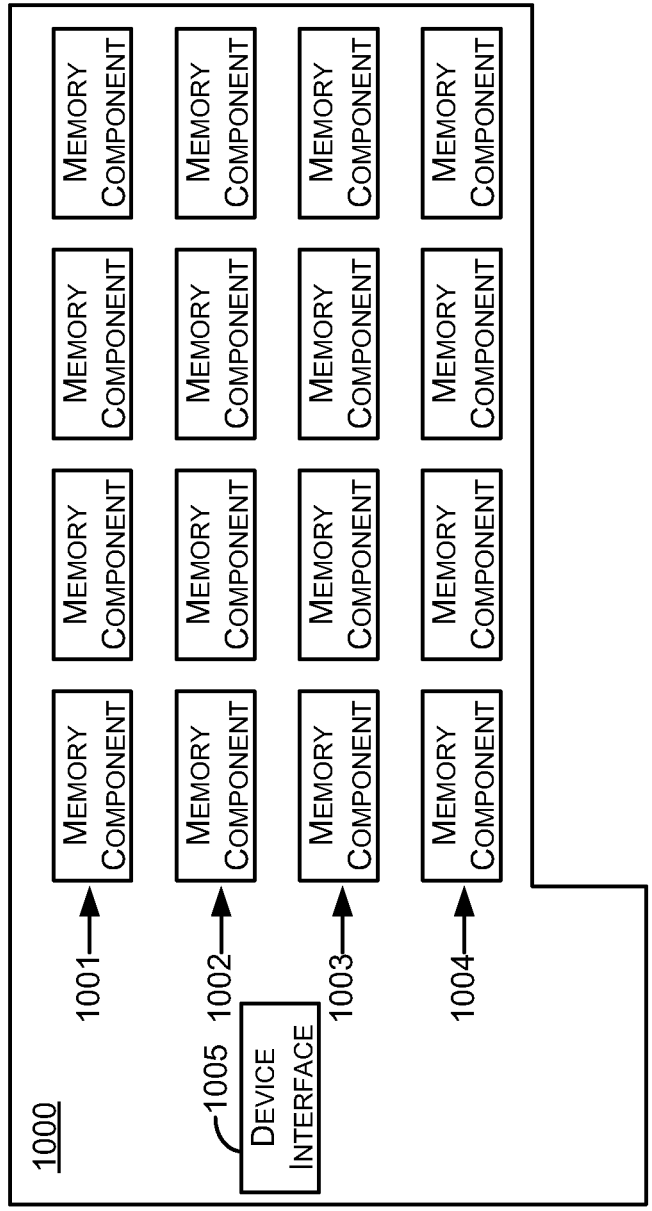
FIG. 10 is a block diagram that illustrates some exemplary components of an SSS card in accordance with aspects of the subject matter described herein.

In one configuration, an SSS may be laid out on a card (e.g., a PCIe card) that may be inserted in a slot of the computer. FIG. 10 is a block diagram that illustrates some exemplary components of an SSS card in accordance with aspects of the subject matter described herein. The SSS card 1000 illustrated in FIG. 10 is not intended to limit layout, form factor, or number of components that may be included on an SSS. Indeed, in other embodiments, the layout, number and arrangement of memory components, and the physical attachment mechanism may vary. For example, some PCIe based cards may have a mechanism that allows a system administrator or the like to hot-swap the cards from the front of a computer similar to how how-swappable hard drives can be swapped in today's systems.

The card 1000 may include arrays of memory devices 1001-1004 (e.g., memory chips) laid out on the card 1000. The card 1000 may include a device interface 1005 that allows the external entities to communicate with the card via a backplane interface (e.g., PCIe). The memory capacity of the card 1000 may vary depending on the number of memory components and memory capacity of each of the memory components placed on the card 1000. The device interface 1005 may provide a way of discovering, configuring, and accessing the memory of the card 1000.

Although PCIe is sometimes referred to herein, aspects of the subject matter described herein may also be applied to other bus interfaces and form factors currently existing or yet to be developed. For example, the device interface 1005 may be directly connected to a processor bus or even embedded inside a processor in some implementations.

Figure 11:
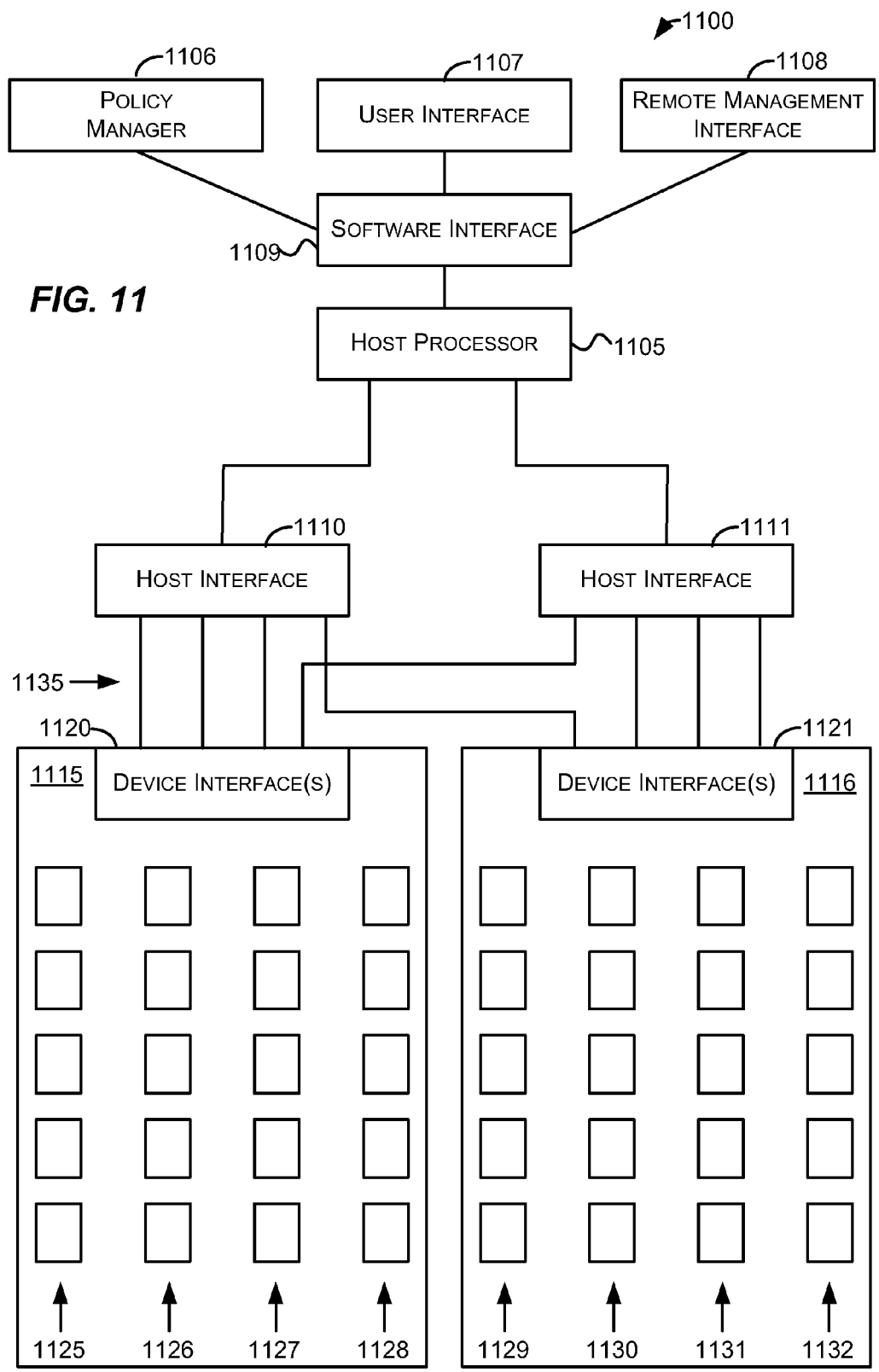
FIG. 11 is a block diagram of some components of an apparatus configured in accordance with aspects of the subject matter described herein.

FIG. 11 is a block diagram of some components of an apparatus configured in accordance with aspects of the subject matter described herein. The apparatus 1100 may include a host processor 1105, policy manager 1106, user interface 1107, remote management interface 1108, software interface 1109, host interfaces 1110-1111, host lanes 1135, and SSS 1115-1116. The SSS 1115 may include discrete memory components 1125-1128 while the SSS 1116 may include discrete memory components 1129-1132. The number of discrete memory components shown is exemplary only. In other implementations, there may be more or fewer discrete memory components and the number of memory components on each device may be different. Each memory component may include one or more memory chips or other storage elements. The SSS 1115-1116 may support hot swapping. As mentioned previously, hot swapping allows storage to be attached or removed from an apparatus without turning the apparatus off.

The SSS 1115 may include one or more device interfaces 1120 while the SSS 1116 may include one or more device interfaces 1121. In one embodiment, the device interfaces 1120-1121 comprise an interface other than a SCSI, SATA, or PATA interface. In one embodiment, there is no SCSI, SATA, or PATA interface disposed between the host processor 1105 and the device interfaces 1120-1121.

Each device interface may have one or more channels (sometimes called device lanes) by which it may communicate with memory of the device. A device may have a maximum number of device lanes that are to be shared to access memory of the device. The number of device lanes (up to the maximum) a device interface uses to communicate with a discrete memory component may be configured via the device interface. Allocating more device lanes to designated discrete memory components may increase the bandwidth to or reliability of communication with the designated discrete memory components.

Figure 14:
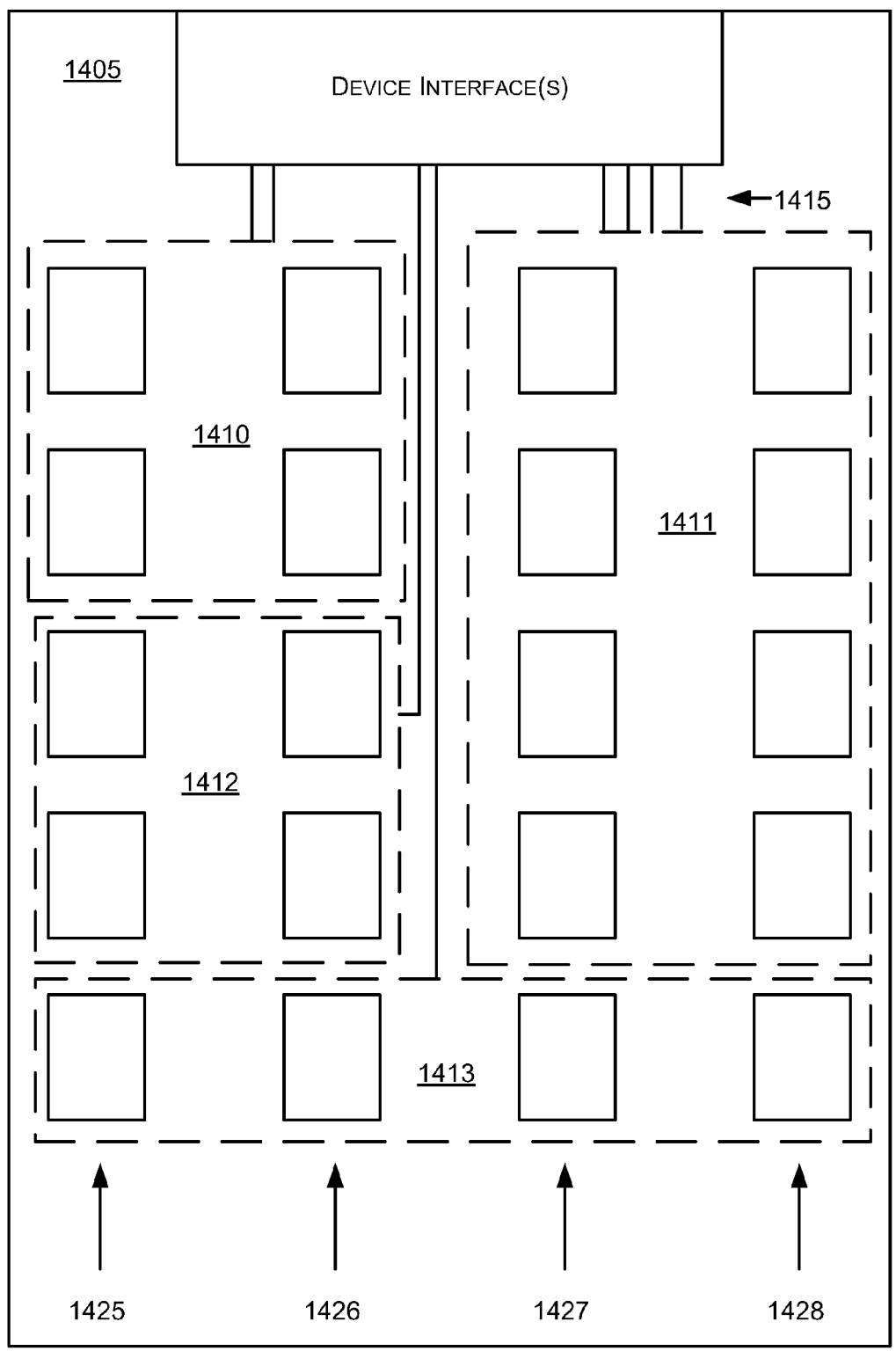
FIG. 14 is a block diagram that represents assignment of devices lanes to solid state storage components that have been partitioned into multiple physical partitions in accordance with aspects of the subject matter described herein.

For example, referring to FIG. 14, the SSS 1405 may include discrete memory components 1425-1428 that have been divided into physical partitions 1410-1413. The SSS 1405 may be configured to have various numbers of device lanes 1415 to each of the physical partitions 1410-1413. As illustrated in FIG. 14, there may be four device lanes to the physical partition 1411, two device lanes to the physical partition 1410, one device lane to the physical partition 1412, and one device lane to the physical partition 1413. The number of device lanes to each physical partition may be configurable.

Returning to FIG. 11, the number of host lanes 1135 from the host interfaces 1110-1111 to the device interfaces 1120-1121 may also be configurable. In one embodiment, an apparatus may be configurable to assign a certain number of host lanes to each device interface. In another embodiment, an apparatus may be configurable to assign certain host lanes to certain device lanes. In yet another embodiment, an apparatus may be configurable to assign percentages of available host lanes to each device interface.

The examples above for options for configuring device and host lanes are not intended to be all-inclusive or exhaustive. Indeed, based on the teachings herein, those skilled in the art may recognize other host or device lane configuration options that may also be used without departing from the spirit and scope of aspects of the subject matter described herein.

Upon request, the device interfaces 1120-1121 may provide information about the SSS 1115-1116. This information may, for example, include:

1. SSS capacity. SSS capacity may include the amount of memory available, the number of discrete memory devices, and the like.

2. SSS configuration options. SSS configuration options may include, for example:

A. Maximum/minimum size for a physical partition of the SSS. For example, a SSS may support partitioning discrete memory components contained thereon into groups where each group physically represents a separate store to external entities. In other words, to an operating system or other software interacting with the SSS, the SSS may present a plurality of different storage devices. A group of storage components of an SSS that is presented to software as a physical device is sometimes referred to herein as a physical partition of the SSS. A device interface may allow partitioning discrete memory components based on the number of discrete memory components, via a specified memory size (e.g., certain amount of memory), or the like.

B. Granularity for sizes of physical partitions. For example, an SSS may be able to put a discrete memory component in one physical partition or another, but may not be able to put a portion of the discrete memory component in one physical partition and another portion of the discrete memory component in another physical partition. Some SSS, however, may allow discrete memory components to be split between physical partitions. Some SSS may only be able to partition discrete memory components in some pre-defined multiple. For example, an SSS may be able to create a physical partition having 2, 4, 6, or some other even number of discrete memory components.

C. Memory reliability. An SSS may support various options for memory reliability. For example, certain discrete memory components may be allocated as "spares." Allocating these spares is sometimes referred to as over provisioning. Some solid state memory can only be written to a certain number of times before the memory becomes unusable. If a used memory component fails or is close to failing, the data of the memory component may be transferred to a spare and subsequent access to the memory component may be directed to the spare. This failover capacity of an SSS may be implemented directly on the SSS itself or may be implemented external to the SSS.

For example, an SSS may include components that track the reliability or wearing of discrete memory portions of the SSS and may re-route access requests to a spare automatically when a memory component fails or is close to failing. An interface may allow fine-grained requests (e.g., a number) that indicate how many spares are to be allocated or may allow coarser-grained requests that indicate a level of reliability (e.g., high, medium, low), etc.

In external implementations, a component (e.g., software or hardware) external to the SSS may receive or keep track of information that indicates whether a device is failing and may take actions to route access requests to a spare. This information may take many forms including keeping track of how many times memory locations have been written to and re-routing access requests accordingly, receiving reliability reports from the device, comparing hashes, checksums, or other data computed from or returned from memory of the device with hashes, checksums, or other data computed from or returned from other storage, and so forth.

Similarly, the SSS may natively support wear leveling. With wear leveling, writes to the device are distributed so that memory of the SSS "wears evenly." By distributing the writes, the number of writes to any particular location may be kept in line with writes to other locations so that the memory in the particular location will not wear out significantly faster than other memory of the device. In some implementations, a device may not natively support wear leveling. In these implementations, an external component may distribute writes as appropriate.

D. RAID capabilities. SSS may natively support one or more RAID configurations for discrete memory components of the SSS. In a RAID configuration, the SSS may perform RAID functionality that treats different hardware partitions as different storage devices (for RAID purposes). Thus, two or more physical partitions on a device may be used together for RAID 0, RAID 1, RAID 3, RAID 4, RAID 5, RAID 10, RAID 01, or some other RAID configuration.

In some cases, a host interface or other component may support RAID configurations that span two or more separate SSS entities (e.g., memory on different cards). In these cases, one or more of the SSS entities may or may not natively support RAID, although memory on the devices may still be used in a RAID configuration using the host interface or other component.

E. Bandwidth capabilities. An apparatus may support configuring host lanes to SSS or even assigning certain host lanes to physical partitions of SSS as mentioned previously. SSS may support configuring the number of device lanes to each physical partition of memory devices as mentioned previously. In some implementations, the number of device lanes to a particular physical partition may be indicated via the device interface. In other implementations, SSS may support a request to give a specified portion of the device's bandwidth to a particular physical partition.

F. Multipath capabilities. SSS may support configuring multiple device lanes to a group of memory components for reliability purposes. Similarly, an apparatus may support configuring multiple host lanes to an SSS for reliability purposes. For example, if one or more lanes to a group of memory components, host interface, or host controller become inoperable, other lanes, if any, may be used to communicate with memory components.

G. Power capabilities. SSS may support different performance options (bandwidth, speed of reads/writes, memory capacity), based on power states of the device. SSS may also support different power management options.

H. Failure mode. SSS may go into a degraded state and perform at a lower level (e.g., fewer writes/reads per second). It may just perform at full throttle until it "burns itself up." It may be able to fail into other storage by transferring data to the other storage.

I. Reporting capabilities. SSS may be able to indicate status regarding memory components. For example, the SSS may be able to indicate the number of times, on average, that a memory component can be written to before failure. As another example, SSS may be able to indicate a projected remaining time for functioning based on historic usage patterns and available spares.

J. Encryption capabilities. SSS may support encryption and may have the ability to encrypt and decrypt data stored on the SSS or any physical partition thereof.

The host processor 1105 may comprise one or more processors similar to the processing unit 120 of FIG. 1. The host interfaces 1110-1111 provide an interface by which the host processor 1105 may communicate with the SSS 1115-1116. The host interfaces 1110-1111 may be included on the host processor 1105 or may be separate from (outside of) the host processor 1105.

The host processor 1105 may execute instructions to discover capabilities of the solid state storage 1115-1116 via the host interfaces 1110-1111. The host processor 1105 may work in conjunction with the host interfaces 1110-1111 and the device interfaces 1120-1121 to discover the capabilities. The processor 1105 may place data regarding the capabilities in a data structure. The host processor 1105 may execute functions of an interface to access data in the data structure to provide to a calling process.

The term "function" as used herein may be thought of as a portion of code, hardware, firmware, or the like that may be executed to perform one or more tasks. In software, although a function may include a block of code that returns data, it is not limited to blocks of code that return data. A function may also perform a specific task without returning any data. Furthermore, a function may or may not have input parameters. A function may include a subroutine, a subprogram, a procedure, method, routine, or the like. A function may be implemented by a predefined protocol specified elsewhere. For example, writing certain data to a region on the host interface may cause a function to execute.

In response to a process requesting information regarding an SSS via an interface, the host processor 1105 may execute one or more functions including one or more of the following:

a function for determining capacity of a solid state storage;

a function for determining partitioning options for the solid state storage;

a function for determining capability of the solid state storage of allocating a portion of memory of the solid state storage to use when other memory of the solid state storage fails (e.g., over provisioning);

a function for discovering existence of the solid state storage;

a function for determining wear leveling capabilities of the solid state storage;

a function for determining whether the solid state storage supports automatic failover from failed memory components to other memory components;

a function for determining RAID capabilities of the solid state storage;

a function for determining bandwidth configurations for the device, a bandwidth configuration indicating a number of device lanes to a physical partition of memory of the solid state storage;

a function for determining multipath capabilities of the solid state storage and/or of host lanes to the solid state storage;

a function for determining power capabilities of the solid state storage;

a function for determining failure mode capabilities of the solid state storage;

a function for determining reporting capabilities of the solid state storage;

a function for determining encryption capabilities of the solid state storage;

an extensibility function that returns data regarding additional capabilities of the solid state device;

other functions not listed above; and the like.

A process may obtain information about capabilities of the SSS 1115-1116 through an interface that indicates the functions above. These functions may obtain data from the data structure previously mentioned and provide the data to a calling process. A purpose of the interface is to provide a common interface by which applications, OS components, and other software on the host processor 1105 may discover the capacity and characteristics of different SSS. The interface may also provide a common interface by which applications, OS components, and other software may access data on SSS without having knowledge of the physical configuration of the SSS.

If an SSS does not support a particular feature, the host processor 1105 may indicate this fact to a calling process. Alternatively, for some features that are not supported on the SSS, the host processor 1105 and/or the host interfaces 1110-1111 may implement the additional features external to the SSS such that a calling process can safely assume that the feature exists. For example, the host interface 1110-1111 may implement wear leveling, RAID capabilities, or other features that may not reside natively on an SSS.

The software interface 1109 may comprise an interface by which the policy manager 1106, the user interface 1107, and the remote management interface 1108 may instruct the host processor 1105 to discover, determine characteristics of, and configure the devices 1115-1116. The software interface 1109 may provide data to the policy manager 1106, the user interface 1107, the remote management interface 1108, or other caller to indicate characteristics of the devices 1115-1116, provide data requested from the devices 1115-1116, and provide reporting data regarding the devices 1115-1116.

The policy manager 1106 may automatically configure a solid state device based on a policy and characteristics of one or more processes. For example, a database application may have different storage needs from a word processing application. Furthermore, these needs may change over time. In response, the policy manager 1106 may again configure the SSS.

The policy manager 1106 may configure the devices 1115-1116 by sending requests via the software interface 1109. The policy manager 1106 may receive information regarding an SSS or process on the apparatus 1100 via the software interface 1109. As used herein, the term configure means configure in the case of an SSS that has not been configured and re-configure in the case of an SSS that has already been configured.

The term "process" and its variants as used herein may include one or more traditional processes, threads, components, libraries, objects that perform tasks, and the like. A process may be implemented in hardware, software, or a combination of hardware and software. In an embodiment, a process is any mechanism, however called, capable of or used in performing an action. A process may be distributed over multiple devices or a single device.

The user interface 1107 is operable to receive input indicative of one or more configuration settings to apply to an SSS. The configuration settings indicated by a user may include configuring one or more physical partitions, host lanes, device lanes, provisioning of the solid state device as a cache, defining one or more policies for configuring the host lanes to the solid state device and/or the device lanes to memory components of the solid state device, and defining policies that govern automatic provisioning, configuration, and assignment of memory of the SSS to act as a cache for a process, other configuration settings mentioned previously, and the like. Similar to the policy manager 1106, the user interface 1107 may communicate via the software interface 1109 to obtain information about an SSS and to configure the SSS.

The remote management interface 1108 allows a process on another apparatus to obtain information about an SSS and/or processes installed or executing on the apparatus 1100. The remote management interface 1108 also allows a process (e.g., a management process) on another apparatus to configure an SSS. The remote management interface 1108 may communicate via the software interface 1109 to obtain information about an SSS and to configure the SSS. The remote management interface 1108 may be used in conjunction with a management console to configure and manage SSS on a plurality of computers.

Figure 12:
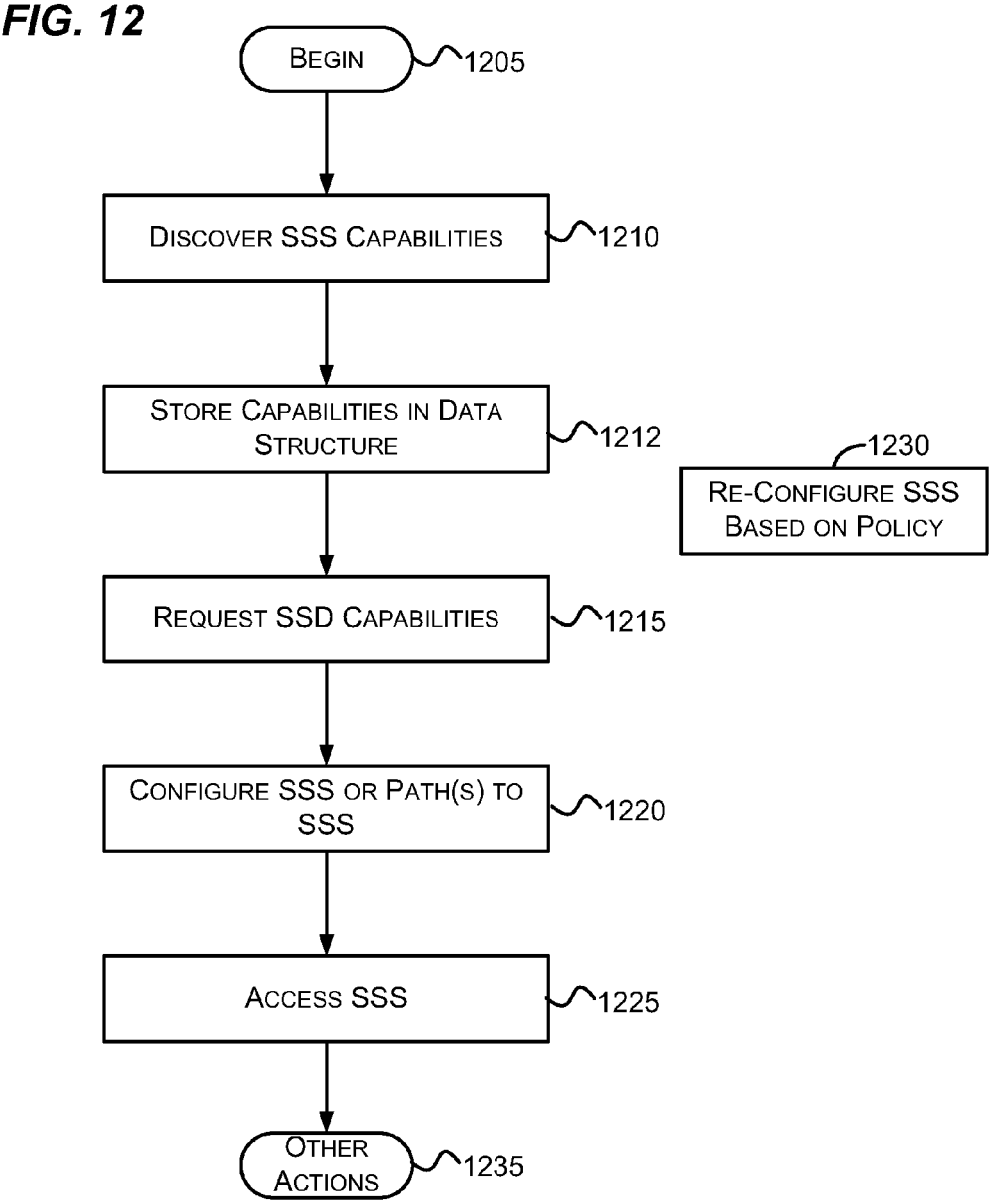
FIGS. 12-13 are flow diagrams that generally represent actions that may occur in accordance with aspects of the subject matter described herein.
Figure 13:
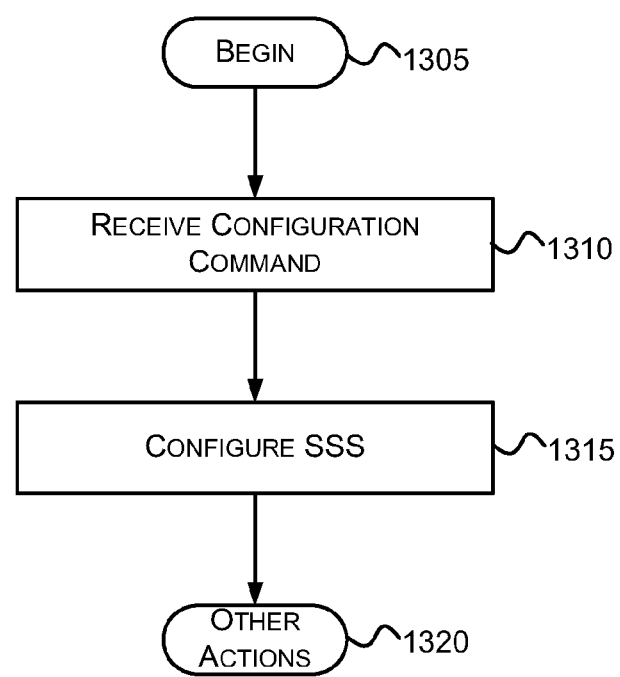

FIGS. 12-13 are flow diagrams that generally represent actions that may occur in accordance with aspects of the subject matter described herein. For simplicity of explanation, the methodology described in conjunction with FIGS. 12-13 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

Turning to FIG. 12, at block 1205, the actions begin. At block 1210, capabilities of SSS are discovered. The SSS may potentially reside on one or more hardware components of a computer. For example, the SSS may reside on multiple cards, chips, or other hardware components of the computer as mentioned previously. Each of the hardware components may potentially have different capabilities. For example, two cards may have different configuration capabilities. For example, referring to FIG. 11, the host processor 1105 may access the host interfaces 1110-1111 to discover the capabilities of the SSS 1115-1116.

At block 1212, the data regarding the capabilities is stored in a data structure. For example, referring to FIGS. 1 and 11, data regarding the capabilities may be stored in the RAM 132, dedicated memory associated with the host interfaces 1110-1111, or some other memory.

At block 1215, the characteristics of the discovered SSS are accessed via an interface. For example, referring to FIG. 11, capabilities of the SSS 1115 may be requested via the software interface 1109. An interface may indicate a plurality of callable functions for determining characteristics of the solid state storage. When called, a function may access data in the data structure indicated above to provide one or more characteristics to a calling process.

At block 1220, configuration regarding the SSS may be performed. For example, a physical partition may be created or changed, a number of host lanes to carry data to and/or from the SSS may be assigned, the number of memory components assigned as spares may be configured, or some other configuration may be performed. For example, referring to FIG. 11, the policy manager 1106, the user interface 1107, or the remote management interface 1108 may request configuring one of the devices 1115-1116 via the software interface 1109.

At block 1225, an SSS may be accessed via the interface. After an SSS has been configured, data may be stored on and retrieved from the SSS. For example, referring to FIG. 11, an application (not shown) may access data on a physical partition of the SSS 1115.

At block 1230, the SSS may be re-configured based on policy. For example, if a physical partition of an SSS is becoming full or is close to the number of writes at which the SSS may begin to fail, the SSS may be re-configured to add more space to the physical partition or assign more memory components as spares to the physical partition. This may be done automatically, semi-automatically, or manually via a policy manager, remote management process, user interface, or the like. For example, referring to FIG. 11, the policy manager 1106 may re-configure an SSS based on a policy. A re-configuration may occur and re-occur at various times after an SSS is discovered.

At block 1235 other actions, if any, may be performed.

Turning to FIG. 13, at block 1305, the actions begin. At block 1310, input indicating a configuration command is received. The input may be received from a user interface, storage management process, or some other entity. For example, referring to FIG. 13, the host interface 1110 may receive input that includes a configuration command for configuring the SSS 1115.

At block 1315, the SSS is configured in accordance with the configuration command. This may involve sending one or more requests to the solid state storage. For example, referring to FIG. 13, the host interface 1110 may send multiple requests to the device interface 1120 to configure the SSS 1115.

At block 1320, other actions, if any, are performed.

As can be seen from the foregoing detailed description, aspects have been described related to storage configuration. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method implemented at least in part by a computer, the method comprising:
   discovering capabilities of solid state storage of the computer, the solid state storage residing on one or more hardware components of the computer, the hardware components having different capabilities;
   storing data regarding the capabilities in a data structure;
   accessing an interface for requesting the capabilities, the interface indicating a plurality of callable functions for determining characteristics of the solid state storage, the plurality of callable functions accessing the data regarding the capabilities in the data structure to provide the characteristics to one or more calling processes, the plurality of callable functions including:
   a function for determining capacity of the solid state device;
   a function for determining capabilities of the solid state storage for creating physical partitions; and
   a function for determining a capability of the solid state storage to allocate a portion of memory of the solid state storage to each physical partition of the solid state storage to use when memory of the physical partition fails.

2. The method of claim 1, wherein the plurality of callable functions further include:
   a function for discovering an existence of the solid state storage;
   a function for determining wear leveling capabilities of the solid state storage;
   a function for determining whether the solid state storage supports automatic failover from failed memory components to other memory components;
   a function for determining RAID capabilities of the solid state storage;
   a function for determining bandwidth configurations for the solid state storage, a bandwidth configuration indicating a number of device lanes to a physical partition of the memory of the solid state storage;
   a function for determining multipath configuration capabilities to the solid state storage and to the physical partitions of the solid state storage;
   a function for determining power capabilities of the solid state storage;
   a function for determining failure mode capabilities of the solid state storage;
   a function for determining reporting capabilities of the solid state storage; and
   a function for determining encryption capabilities of the solid state storage.

3. The method of claim 2, further comprising configuring, via the interface, a characteristic of the solid state storage corresponding to one or more of the plurality of callable functions.

4. The method of claim 1, wherein the accessing comprises executing an operating system of the computer, the operating system instantiating one or more components corresponding to the plurality of callable functions.

5. The method of claim 1, further comprising receiving, via the interface, a request for data from the solid state storage and, in response, obtaining the data from the solid state storage via a bus of the computer without traversing a SCSI, SATA, or PATA interface to obtain the data from the solid state storage.

6. The method of claim 1, further comprising configuring, via the interface, capacity of, host lanes to, device lanes of, and/or reliability of the solid state storage based on a storage policy.

7. The method of claim 6, wherein configuring the capacity of the solid state storage comprises changing, via the interface, a number of memory components of the solid state storage assigned to a physical partition of the solid state storage.

8. The method of claim 6, wherein configuring host lanes to the solid state storage comprises changing, via the interface, a number of bus lanes assigned to carry data to and/or from the solid state storage.

9. The method of claim 6, wherein configuring device lanes of the solid state storage comprises changing, via the interface, a number of device lanes assigned to carry data to and/or from a physical partition of memory components of the solid state storage.

10. The method of claim 6, wherein configuring reliability of the solid state storage comprises changing a number of memory components assigned as spares.

11. In a computing environment, an apparatus, comprising:
a solid state storage having a device interface and plurality of solid state memory components, the device interface operable to provide information regarding characteristics of the solid state storage; and
a processor operable to execute instructions to discover capabilities of the solid state storage and other solid state storage, if any, of the apparatus and to place data regarding the capabilities in a data structure, the other solid state storage having different capabilities from the solid state storage, the processor further operable to execute functions indicated by an interface, the functions for accessing the data in the data structure to provide requested information regarding the solid state storage, the functions including:
a function for determining capacity of the solid state storage;
a function for determining physical partitioning options for the solid state storage; and
a function for determining capability of the solid state storage of allocating a portion of memory of the solid state storage to use when other memory of the solid state storage fails.

12. The apparatus of claim 11, wherein the functions indicated by the host interface further include:
a function for discovering existence of the solid state storage;
a function for determining wear leveling capabilities of the solid state storage;
a function for determining whether the solid state storage supports automatic failover from failed memory components to other memory components;
a function for determining RAID capabilities of the solid state storage;
a function for determining bandwidth configurations for the storage, a bandwidth configuration indicating a number of device lanes to a physical partition of memory of the solid state storage;
a function for determining multipath configuration capabilities to the solid state storage and to physical partitions of the solid state storage;
a function for determining power capabilities of the solid state storage;
a function for determining failure mode capabilities of the solid state storage;
a function for determining reporting capabilities of the solid state storage; and
a function for determining encryption capabilities of the solid state storage.

13. The apparatus of claim 11, wherein the host interface is located outside of the processor.

14. The apparatus of claim 11, wherein the device interface does not comprise a SCSI, SATA, or PATA interface and wherein there is no SCSI, SATA, or PATA interface disposed between the processor and the device interface.

15. The apparatus of claim 11, further comprising a remote management interface operable to provide information returned by the functions to another apparatus, the remote management interface also operable to provide configuration requests from the another apparatus to the device interface for configuring the solid state storage.

16. The apparatus of claim 11, wherein the solid state storage resides on a card that is hot-swappable.

17. The apparatus of claim 11, further comprising a user interface operable to receive input indicative of one or more configuration settings to apply to the solid state storage, the configuration settings including configuring one or more physical partitions, host lanes, device lanes, provisioning of the solid state storage as a cache, defining one or more policies for configuring or reconfiguring the host lanes to the solid state storage and/or device lanes of the solid state storage, and defining policies that govern automatic provisioning, configuration, and assignment of memory of the solid state storage to act as a cache for an operating system or application thereof.

18. The apparatus of claim 11, further comprising a policy manager that automatically configures the solid state storage based on a policy and characteristics of a process.

19. A computer-readable storage memory having computer-executable instructions, which when executed perform actions, comprising:
receiving, via an interface, input indicative of a configuration command for configuring a solid state storage of a computer, the solid state storage residing on one or more hardware components of the computer, the hardware components having different capabilities, the interface capable of providing data including:
data regarding capacity of the solid state storage,
data regarding physical partitioning options for the solid state storage,
data regarding capability of the solid state storage of allocating a portion of memory of the solid state storage to use when other memory of the solid state storage fails,
data regarding wear leveling capabilities of the solid state storage,
data regarding whether the solid state storage supports automatic failover from failed memory components to other memory components,
data regarding RAID capabilities of the solid state storage,
data regarding bandwidth configurations for the storage, a bandwidth configuration indicating a number of device lanes to a physical partition of memory of the solid state storage,
data regarding multipath capabilities of the solid state storage,
data regarding power capabilities of the solid state storage,
data regarding failure mode capabilities of the solid state storage, and
data regarding reporting capabilities of the solid state storage; and
sending one or more requests to the solid state storage to configure the solid state storage in accordance with the configuration command.

20. The computer-readable storage memory of claim 19, wherein receiving, via an interface, input indicative of a configuration command for configuring a solid state storage comprises receiving the input from a user interface or storage management process.

* * * * *